United States Patent [19]

Stanfield et al.

[11] Patent Number: 4,787,011
[45] Date of Patent: Nov. 22, 1988

[54] CONTROL CENTER UNIT SHELF ASSEMBLY

[75] Inventors: Harold W. Stanfield, Mequon, Wis.; Richard A. VonRotz, Peru, Ind.

[73] Assignee: Square D Company, Palatine, Ill.

[21] Appl. No.: 898,178

[22] Filed: Aug. 20, 1986

[51] Int. Cl.⁴ .............................................. H05K 7/14
[52] U.S. Cl. ..................................... 361/391; 361/417
[58] Field of Search ............... 361/391, 390, 358, 361, 361/363, 417, 419, 420; 200/50 A

[56] References Cited

U.S. PATENT DOCUMENTS

| | | | |
|---|---|---|---|
| 2,488,372 | 11/1949 | Breisch | 361/390 |
| 3,278,698 | 10/1966 | Metz | 200/50 A |
| 3,541,397 | 11/1970 | Kobryner | 361/363 |
| 4,305,114 | 12/1981 | Takagi et al. | 361/342 |
| 4,546,418 | 10/1985 | Baggio et al. | 361/363 |

*Primary Examiner*—A. D. Pellinen
*Assistant Examiner*—Morris Ginsburg
*Attorney, Agent, or Firm*—Thomas B. Lindgren; Mary R. Jankousky

[57] ABSTRACT

A control center utilizing individual control units that hang from a unit shelf in a control center section. A tongue on the top of each control unit mates with the groove of the unit shelf to provide quick and easy alignment for electrical connections between the control unit and the vertical bus bar. The unit shelf and door are designed to be secured simultaneously to the cabinet.

5 Claims, 6 Drawing Sheets

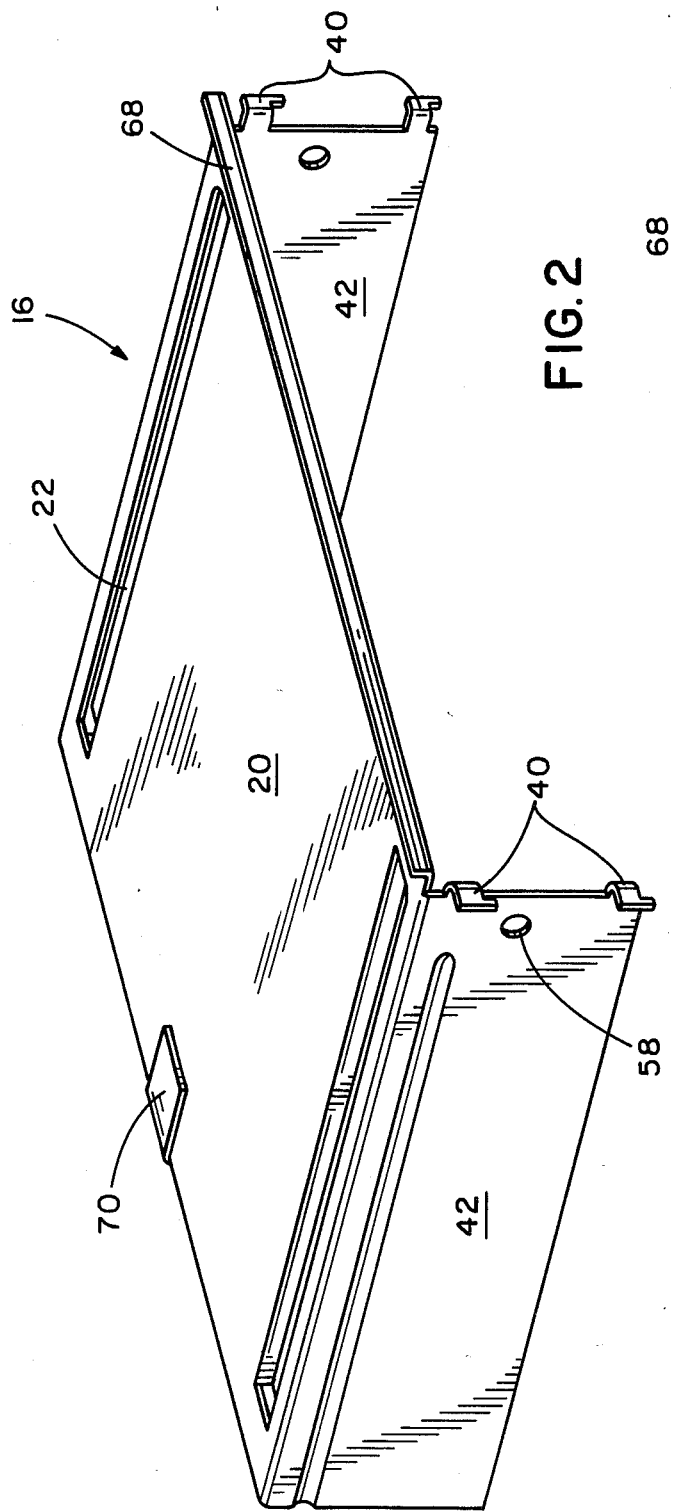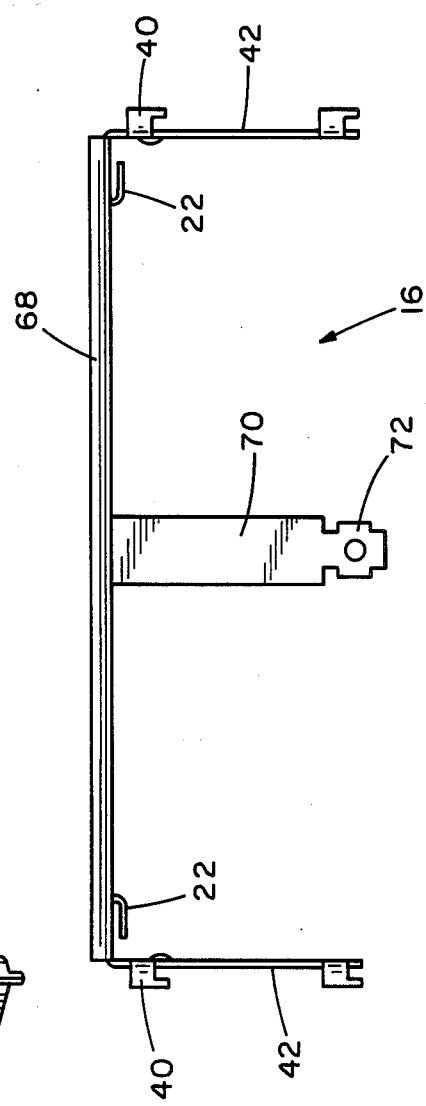

CONTROL CENTER UNIT SHELF ASSEMBLY

CROSS-REFERENCES TO RELATED APPLICATIONS

Certain inventions disclosed in the present application are disclosed and claimed in the following copending applications all filed simultaneously herewith and herein incorporated by reference: Ser. No. 898,175, entitled "Horizontal Bus Bar Splice For Control Center", and Ser. No. 898,179, entitled "Control Unit Height Adapter", both by H. W. Stanfield and R. Von-Rotz, and Ser. No. 898,474, entitled "Advanceable and Retractable Plug on Unit Assembly for a Motor Control Center", by S. Ledbetter and R. Cox.

BACKGROUND OF THE INVENTION

This invention relates to a control center having internal control units that hang from a unit shelf within the control center.

Control centers are generally made up of a number of separate control center sections that are placed side by side. Each central center section houses a number of control units vertically stacked one on top of the other. Electrical power is supplied to the control center via horizontal bus bars located in the back of the control center. Power is distributed through the horizontal bus bars and the vertical bus bars that run the length of each section to the individual control units. Each control unit must be properly positioned on the a respective shelf, since the circuit breaker or switch that is mounted within each control unit must be electrically connected with the appropriate vertical bus bars. The tolerance for this connection is low since the fit between the circuit breaker or switch and the vertical bus bar must be tight to accommodate the power flow through the joint. In the prior art, a control unit was placed in the proper location by positioning the screw holes of the control unit with the screw holes of a respective shelf. This method is relatively time consuming and hence costly.

The prior art shelf also had separate procedures for securing the shelf and the door to the frame of the control center section, each with its own individual connectors. Since a control center section often has a large number of control units, each with associated doors and shelves, any reduction in the number of operations or components required for plant assembly results in a large savings in production costs. Users likewise save time and expense in making any desired modifications to the control units.

It is an object of the present invention to provide a control center having a quick installation procedure for the control unit assembly.

It is a further object of this invention to provide accurate alignment of the circuit breaker or switch with the vertical bus bar within a control center.

Another object is to provide a control unit with easier and more economical assembly of the shelves, doors, and other components thereof.

Further objects and features of the invention will be readily apparent to those skilled in the art from the specification and appended drawings illustrating certain preferred embodiments.

SUMMARY OF THE INVENTION

The present invention provides a control center composed of adjacent sections each having a number of control units mounted one on top of the other. Each control unit hangs from a unit shelf positioned within a section. Each unit shelf has on each side a flange with an extended ear member that fits into a receiving slot in the front corner channel of each control section. The corner channel receiving slots for the shelf ear members are spaced three inches apart to allow the length of each control unit to be changed in three inch increments. Between each pair of adjacent receiving slots is a seat adapted to receive a door tab. After the shelf and door are mounted on the control section frame, a screw is then placed through the shelf side wall, the corner channel and the door tab to secure all three components together with one connector. For mounting the control unit assembly in a section, the top of each control unit has two tongues. Each tongue mates with a respective groove of the flat surface of the unit shelf. When the tongue is mated with the groove, the control unit is properly positioned for connecting the interrupting apparatus, such as a circuit breaker or switch, with the vertical bus bars located in the back of each control section.

BRIEF DESCRIPTION OF THE DRAWINGS

FIG. 2 is a perspective view of a unit shelf.

FIG. 3 is a front view of a unit shelf.

DESCRIPTION OF THE PREFERRED EMBODIMENT

Figure 1:
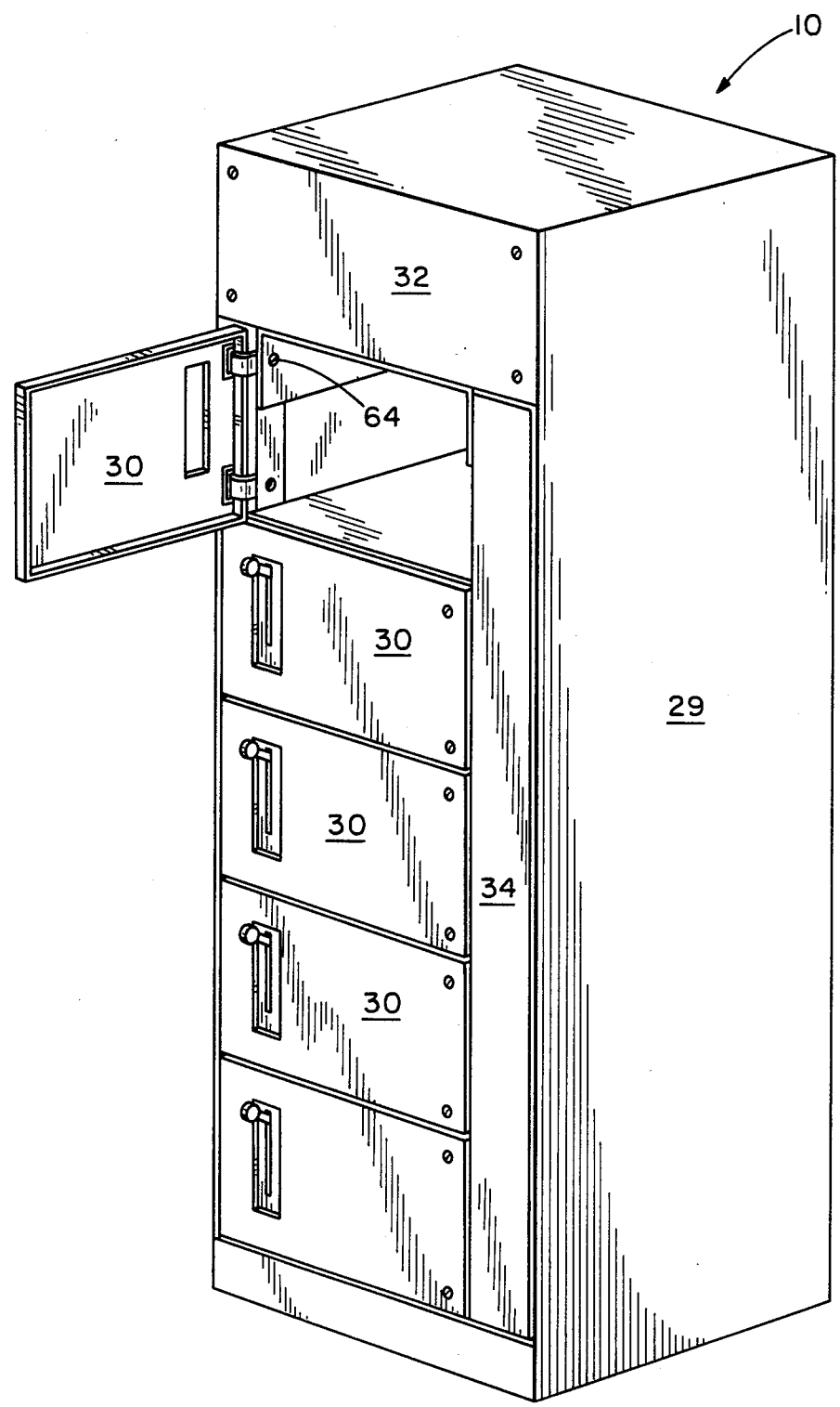
FIG. 1 is a perspective view of a control center section with one saddle assembly removed.

Referring now to the drawings, and in particular to FIG. 1, a motor control center section, indicated generally as numeral 10, is shown. Each section 10 contains individual control units 12 stacked one on top of the other. Several control center sections 10 are generally placed side by side in an industrial location to control the electrical equipment of a plant. A control unit contains components, such as motor starters 17, circuit breakers 18, switches, relays, wiring and terminal blocks 19 as are necessary to control the electrical power to a particular piece of plant equipment. The above described components are mounted within a saddle assembly 14 which hangs from a unit shelf 16. The unit shelves 16 are mounted in the control center section 10, with appropriate vertical spacing from one another to allow for the insertion of a control unit 12.

Each unit shelf 16 has a flat surface 20 with a depressed shelf groove 22 near and along each side edge and a front upturned edge 68. The depth of shelf 16 is less than the depth of the control center section to accommodate the vertical bus bars mounted in the control center back of the section.

Figure 4:
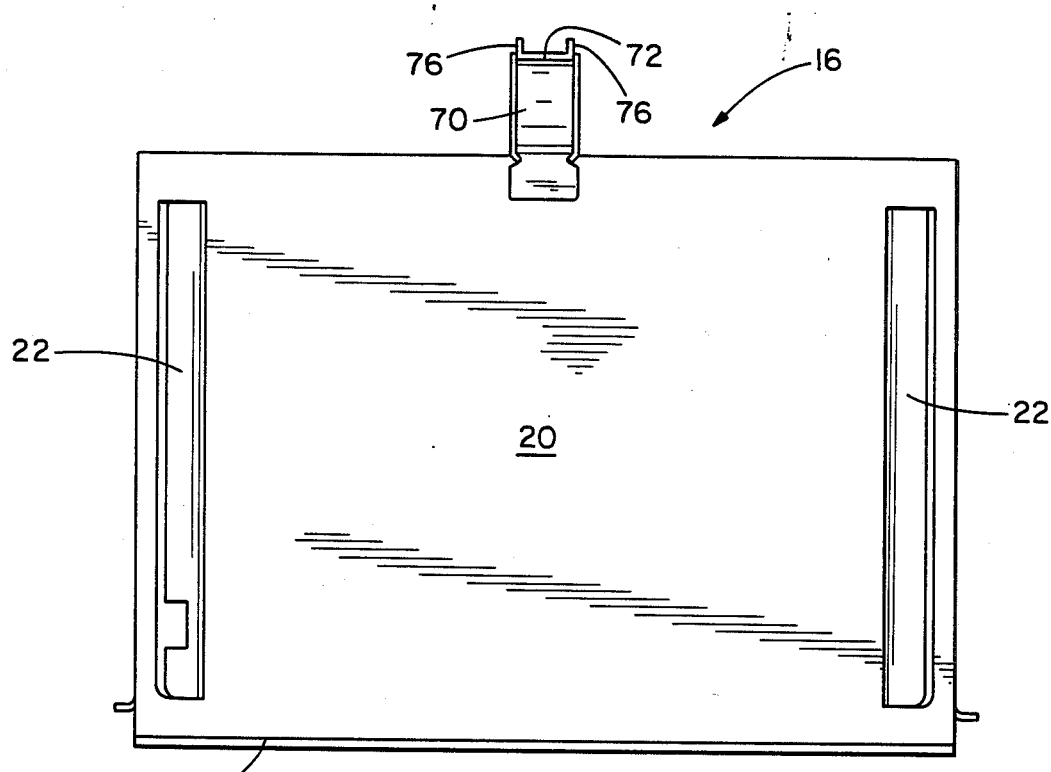
FIG. 4 is a top view of a unit shelf.
Figure 5:
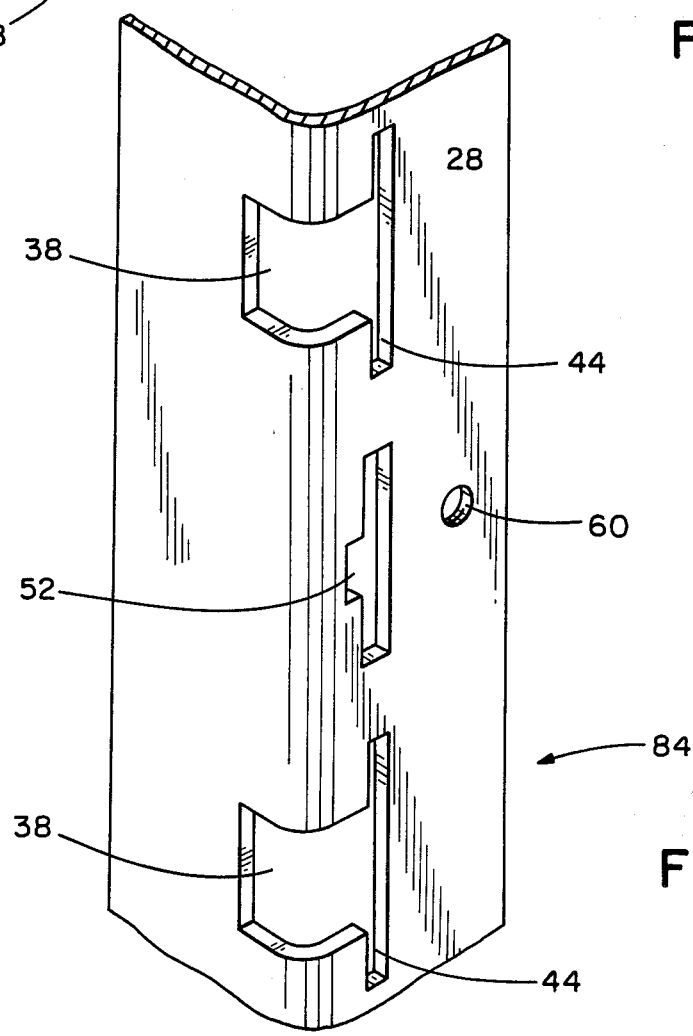
FIG. 5 is an enlarged partial perspective view of a portion of a front corner channel.
Figure 6:
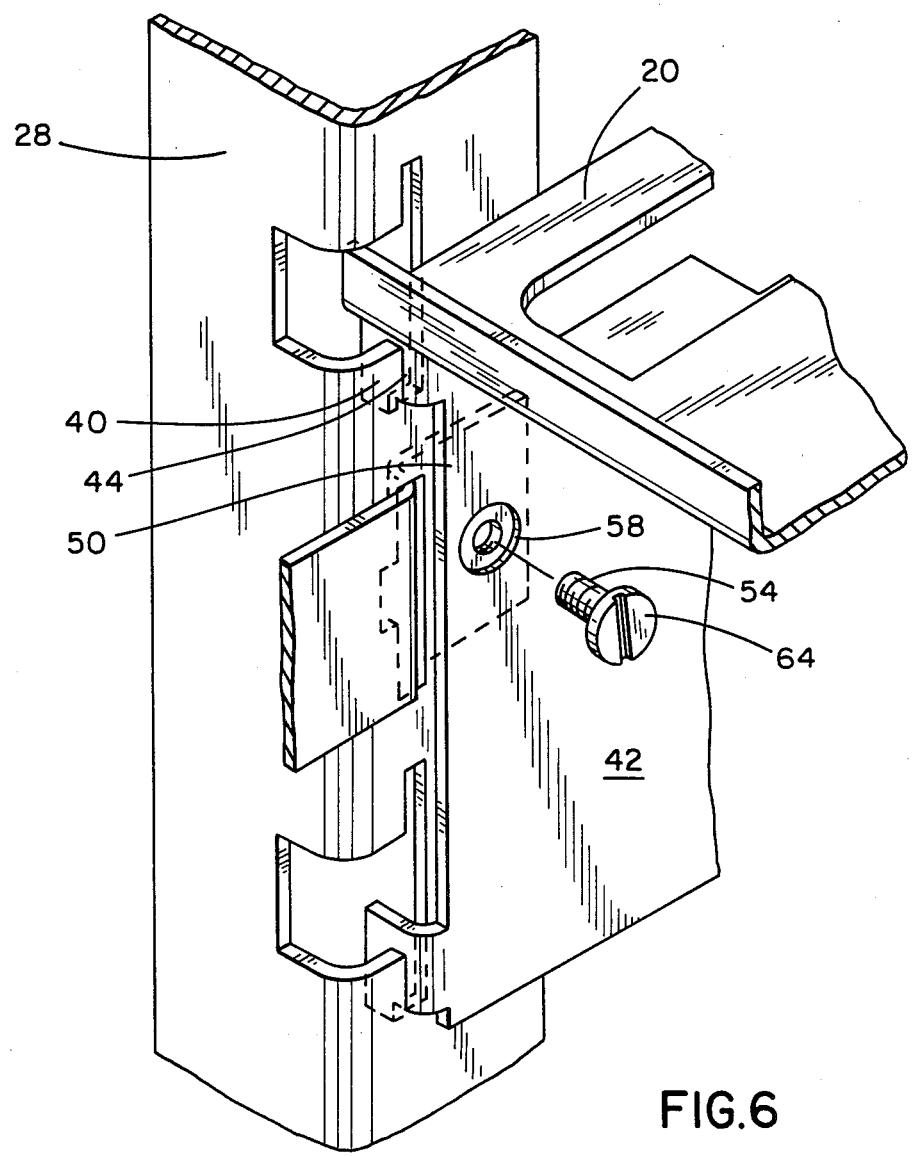
FIG. 6 is an enlarged partial perspective view of a front corner channel, shelf, door and control.
Figure 9:
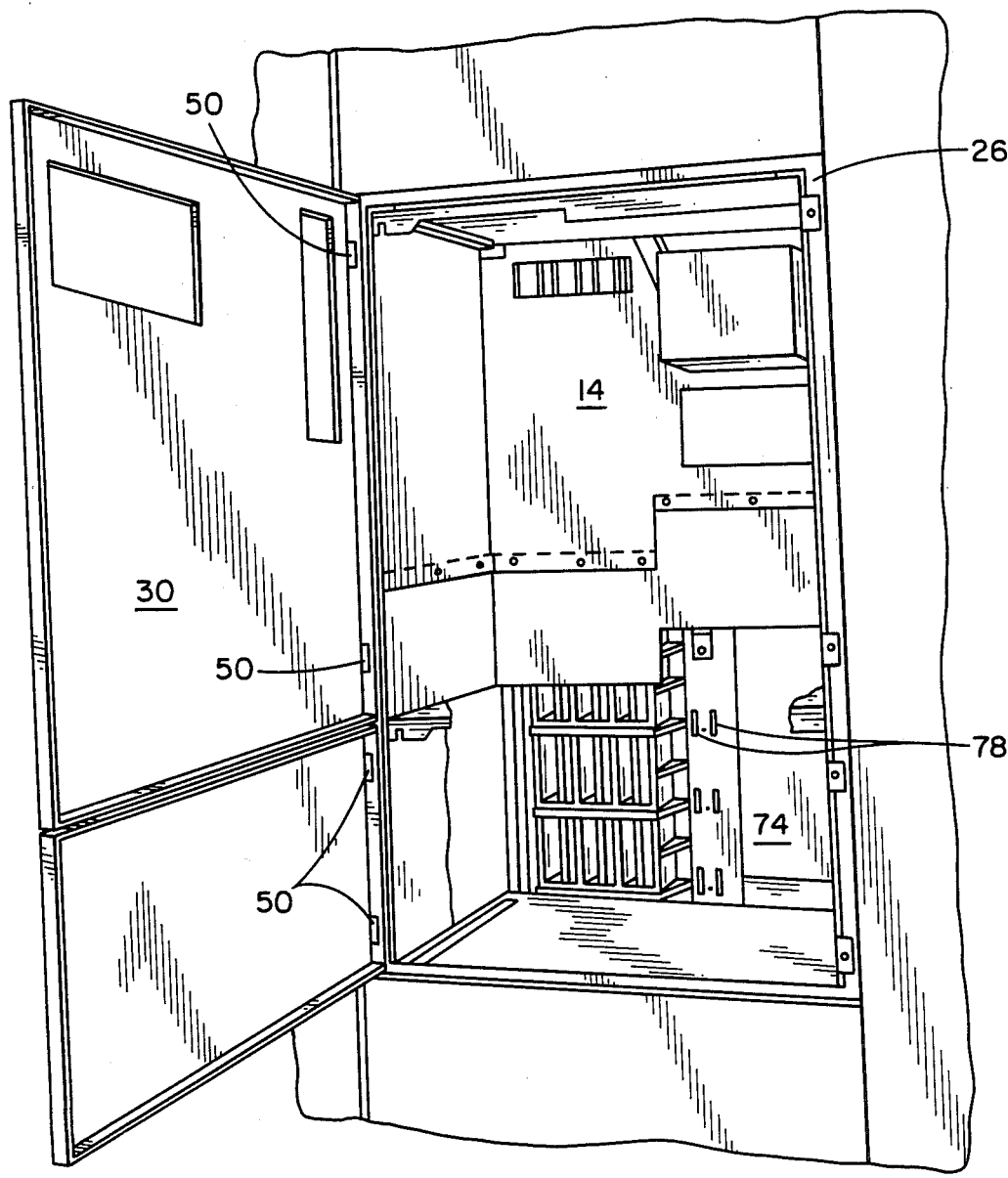
FIG. 9 is a partial perspective view of a cabinet and saddle assembly.

To provide additional support for the rear of the unit shelf 16, a U-shaped bar 70 (See FIG. 4) extends diagonally from the rear edge of the shelf flat surface 20 to end in a head 72 that is connected to the back wall 74 of the control center section (See FIG. 9). The head 72 has side projections 76 that fit into complimentary grooves 78 in the back wall 74 of the control center section. A screw or other connector then secures the head 72 to the back wall 74.

Referring again to FIG. 2, the unit shelf 16 has an approximately perpendicular flange 42 extending downward at each side edge. At the front of each flange 42 is an ear member 40 that is used to secure the unit shelf 16 to the corner channel receiving slots of the control center section 10.

Figure 7:
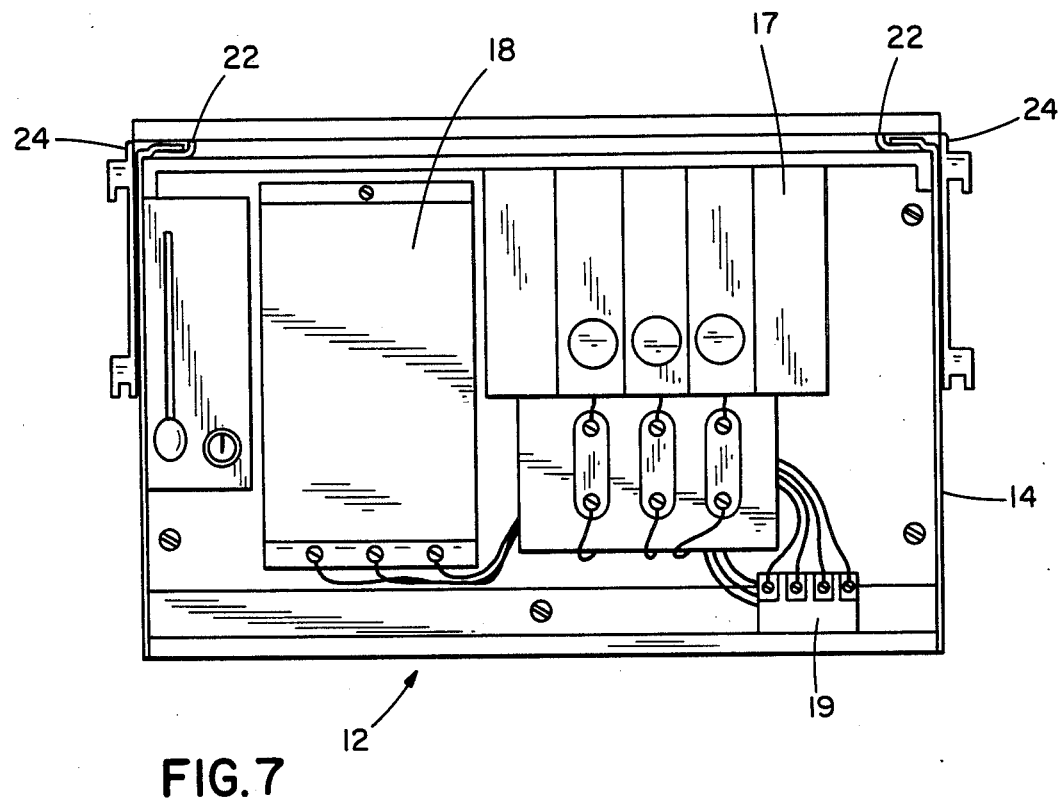
FIG. 7 is a front view of a unit mounted on a unit shelf.
Figure 8:
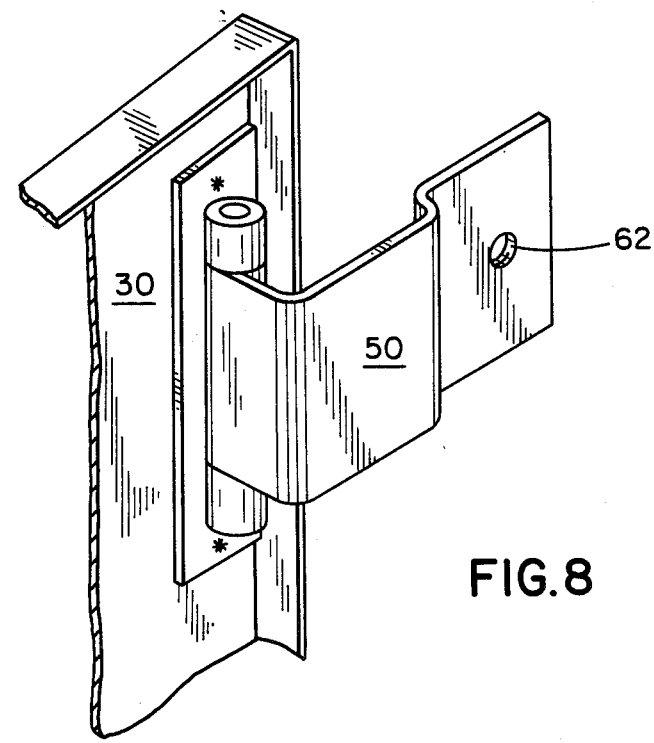
FIG. 8 is an enlarged partial perspective view of a door and tab.

The saddle assembly 14 has a tongue 24 located on the top along each side edge, as shown in FIG. 7. Each individual control unit 12 is inserted into the control center section 10 by positioning the tongue 24 within the shelf groove 22 and sliding the unit into the control center section. This properly aligns the control unit 12 so that the electrical connections may be made between the control unit and the vertical bus bars. The circuit breaker 18 or switch generally has unit stabs which make a plug-on connection with the vertical bus bars. The plug-on connection is the preferred type of electrical connection because it provides for quick and easy insertion of the saddle assembly 14 into control center section and removal therefrom. However, the plug-on connection requires tight tolerances for the horizontal position of the unit stabs. The present invention provides a design which meets the required electrical tolerances by preparing for the exact placement of the control unit 12 in relation to the unit shelf 16 and frame 26 of the control center section.

Each control center section 10 has a frame 26 consisting of four corner channels 84 held together by side, front and back channels located at the top and bottom of the frame 26. Adjacent control center sections have no side panels between them to increase air flow for improved heat dissipation. The outer control center sections 10 each have one side panel 29 on the exposed exterior side. Each control center section 10 has a number of unit doors 30, a horizontal bus bar cover 32 and a wire way cover 34 on the front and a solid back wall 74.

Each corner channel 28 has a series of T-shaped slots 38 spaced at three inch intervals along its length. Between each adjacent pair of slots 38 is a generally vertical seat 52. The unit shelf 16 is mounted within the frame 26 by inserting the flange ear member 40 into the slot 38 and forcing the shelf downwards so that the ear member 40 fits securely within the downward tail 44 of the slot 38.

Each unit door 30 has two door tabs 50 hinged to the inside edge of the unit door. The door tabs 50 have a curved shape to fit within one of the vertical seats 52. Once the door tab 50 has been placed within the vertical seat 38 a screw 54 or other connector is placed through the hole 58 in the shelf side flange 42, the hole 60 in the corner channel and the hole 62 in the door tab 50 to secure all three components. The hole 58 in the shelf side flange is enlarged so that the screw head 64 is flush against the corner channel with the edge of the screw head being adjacent the hole 58 in the shelf side flange 42. The screw head 64 provides additional support to prevent the shelf 16 from being moved.

This design also provides for easy insertion and alignment of individual control units 12 within the control center section 10. By hanging each control unit 12 from a unit shelf 16 instead of placing the unit on top of a shelf, there is easier access to the components within the unit. The hanging method allows the saddle assembly to be almost completely withdrawn from the control center section 10 while making inspections or modifying the control units. The arrangement described herein also efficiently secures the shelf and to the cabinet with only one connector to prevent the relative movement between those components. As previously described, this improved design provides quick and accurate alignment of the saddle assembly 14 and circuit breaker with the vertical bus bars.

While the invention has particularly been shown and described with reference to a preferred embodiment, it will be understood by those skilled in the art that variations in form, construction and arrangement may be made therein without departing from the spirit and scope of the invention.

We claim:

1. A control center comprising:
    a frame;
    a control unit;
    a shelf vertically positioning said control unit within said frame at predetermined heights, said shelf being mounted on said frame, said shelf having a surface juxtaposed said frame;
    a door providing access to the control unit, said door being mounted on said frame, said door having a surface positioned juxtaposed said frame; and
    a connector passing through said frame, said shelf and said door.

2. A control center as claimed in claim 1 wherein said frame comprises a plurality of vertical corner channels, wherein said shelf comprises a flat surface and a plurality of flanges, said flat surface extending between adjacent corner channels, each of said flanges being positioned juxtaposed one of said corner channels, said connector passing through one of said corner channels, one of said flanges and said door.

3. A control center as claimed in claim 2 wherein said door surface being juxtaposed said frame comprises a movable mounted tab member.

4. A control center as claimed in claim 3 wherein each of said corner channels includes a slot adapted for receiving a door tab member to mount said door on said frame.

5. A control center as claimed in claim 2, wherein said shelf additionally comprises a groove of a predetermined size along each side of said flat surface, wherein said control unit additionally comprises a tongue adjacent each side, said tongue being adapted to fit within said shelf groove when said control unit is placed within said control center.

* * * * *